INVENTOR.
ROBERT J. SPAIN
BY
John A. Lahive, Jr.
ATTORNEYS

INVENTOR.
ROBERT J. SPAIN
BY *Weingarten, Orenbuch & Lahive*
ATTORNEYS

DOMAIN TIP PROPAGATION SHIFT REGISTER

Filed Oct. 19, 1967

INVENTOR.
ROBERT J. SPAIN
BY
John A. Lahive, Jr.
ATTORNEYS

DOMAIN TIP PROPAGATION SHIFT REGISTER

Filed Oct. 19, 1967

INVENTOR.
ROBERT J. SPAIN
BY
Weingarten, Orenbuch & Lahive
ATTORNEYS

DOMAIN TIP PROPAGATION SHIFT REGISTER

Filed Oct. 19, 1967 Sheet 5 of 5

INVENTOR.
ROBERT J. SPAIN
BY
John A. Lahive, Jr.
ATTORNEYS

3,438,016
DOMAIN TIP PROPAGATION SHIFT REGISTER

Robert J. Spain, Paris, France, assignor, by mesne assignments, to Cambridge Memory Systems, Inc., Farmington, Mass., a corporation of Massachusetts Continuation-in-part of application Ser. No. 431,364, Feb. 9, 1965. This application Oct. 19, 1967, Ser. No. 681,047
Int. Cl. G11b 5/62
U.S. Cl. 340—174 9 Claims

ABSTRACT OF THE DISCLOSURE

A shift register formed of a zig-zag low coercive force channel in a magnetic film medium which has an easy axis of magnetization. Conductors are arranged to nucleate a small domain of reversed magnetization at one end of the channel. Other conductors are energized in sequence to produce magnetic fields at an angle to said easy axis to extend the reversed magnetic domain along one leg of the channel and then to return the original area of reversed magnetization to a magnetization state the same as the remainder of the film leaving, however, a small domain of reversed magnetization at the further end of the zig-zag leg.

This application is a continuation-in-part of co-pending patent application Ser. No. 431,364 filed Feb. 9, 1965, now abandoned, entitled "Thin Magnetic Film Shift Register."

This invention relates in general to shift registers and more particularly to a magnetic shift register utilizing the field reversing characteristics of specially constructed thin magnetic films.

Shift register devices utilizing thin, anisotropic magnetic films have been constructed in the past. These shift registers have employed either one of two field reversing mechanisms; namely, domain wall motion and uniform rotation of the magnetization. In those devices employing domain wall motion, an interdomain wall in a thin magnetic film provides the transition region between oppositely oriented magnetic domains. Information which has been entered into the shift register is then shifted through the register on the basis of lateral wall motion. However, lateral wall mobility is generally in the order of $10^4$ cm. per second per oersted and hence shift registers of this type are severely limited in terms of speed of operation. Devices employing the second mechanism, that is, uniform rotation of magnetization, operate much more rapidly, the magnetic elements exhibiting switching times in the order of $1\times10^{-9}$ seconds. In this instance, the shift register is constructed of a series of independent magnetic elements and hence for propagation of information along the shift register the information must be transferred from element to element. Since the external field from a single thin film is very small, complete transfer of information from one element to the other is difficult to obtain and hence propagation losses in a shift register of this type are relatively severe.

It is, therefore, the primary object of the present invention to provide a shift register which effects efficient propagation of information through it at relatively high speeds.

It is another object of the present invention to provide a thin magnetic film shift register characterized by substantially lossless propagation of information.

Broadly speaking, the shift register of the present invention is constructed of a thin ferromagnetic film, magnetically anisotropic, and employs the mode of magnetization reversal referred to as "domain tip propagation." In this particular mode of switching, a small lenticular shaped domain of reversed magnetization in a permalloy film having an easy axis of magnetization is caused to propagate along the long axis of the lentil by the application of an intermediate magnitude switching field at an angle to the easy axis of magnetization. The domain tip propagation attains speeds considerably higher than those of lateral wall traversal, frequently reaching values in the order of $5\times10^5$ cm. per second. While the theory of the mechanisms governing this particular type of domain propagation is at present incomplete, a relatively extensive discussion of the phenomenon may be found in an article in the Journal of Applied Physics, vol. 33, No. 4, April 1962, entitled, "Non-Coherent Switching in Permalloy Films," by D. O. Smith and K. J. Harte.

In general, the manner in which this mode of magnetization reversal may be employed to form a shift register is as follows: A narrow strip of thin magnetic film is initially magnetized along one easy axis direction. A small information bearing domain of reversed magnetization is then created at one edge of the strip. A magnetic field of suitable magnitude is applied to the thin film at such an angle to the easy axis of magnetization, that it causes growth of the domain tip across the short axis of the thin film. Since the applied field is at an angle to the easy axis, the domain of reversed magnetization reaches the opposing edge of the film strip at a position laterally displaced from the original domain tip with the direction of displacement depending upon the angle at which the field was applied. In the next step in the sequence, a field is applied along the easy axis of magnetization in a direction opposing the reversed magnetization thereby causing the domain to shrink by receding from the original tip location back along the path of growth of the domain. If the field applied to effect this shrinking is arranged to be considerably weaker near the opposing film edge, then the domain is inhibited from being erased at this opposing edge and the total effect is that the small lenticular-shaped domain has been displaced from one edge to the other of the film strip while at the same time undergoing some lateral displacement. In the next step in the shifting operation, a reversing field is again applied to the newly located domain, only in this instance the angular displacement of the field from the easy axis is reversed with respect to the direction in which the original domain propagating field was applied. Once again, growth of the domain tip takes place and the domain extends back across the original edge of the thin film, but further displaced transversely along the long axis of the film. The shifting operation is completed by once again applying a field along the easy axis of the film to shrink the domain back toward the original edge and in this instance the magnitude of the field is reduced near the original edge of the film.

The result then of these sequential steps is that a small domain of reversed magnetization has been shifted along the long edge of the film. If the same sequence of field applications were carried out on a thin film area in which there had been no domain tip in the original location, then, of course, no domain tip would be in the second location, since the fields applied during the shifting operation are below that required for the spontaneous nucleation of domains.

While the above sequential steps have indicated the mechanism of the shift register of this invention, the situation as described above would not meet the tolerances required for an actual thin film device. Thus, some means of control over the direction of the domain tip growth is needed in order to provide for exact location, along the long dimension, of the domains which represent stored information. A specific means of control is provided by producing a thin magnetic film which includes regions of low coercive force in the form of a narrow channel which traverses back and forth across the film in a zig-zag fashion. If the remainder of the film is formed of high coercive force material, then the switching of the magnetization may be restricted completely to the channel. In addition, the presence of magnetic material outside the bounds of the zig-zag channel tends to inhibit the spontaneous nucleation of domains of reversed magnetization within the channel.

The shift register of this invention will be more fully understood from the following detailed description when taken in conjunction with the accompanying drawing in which.

Figure 1:
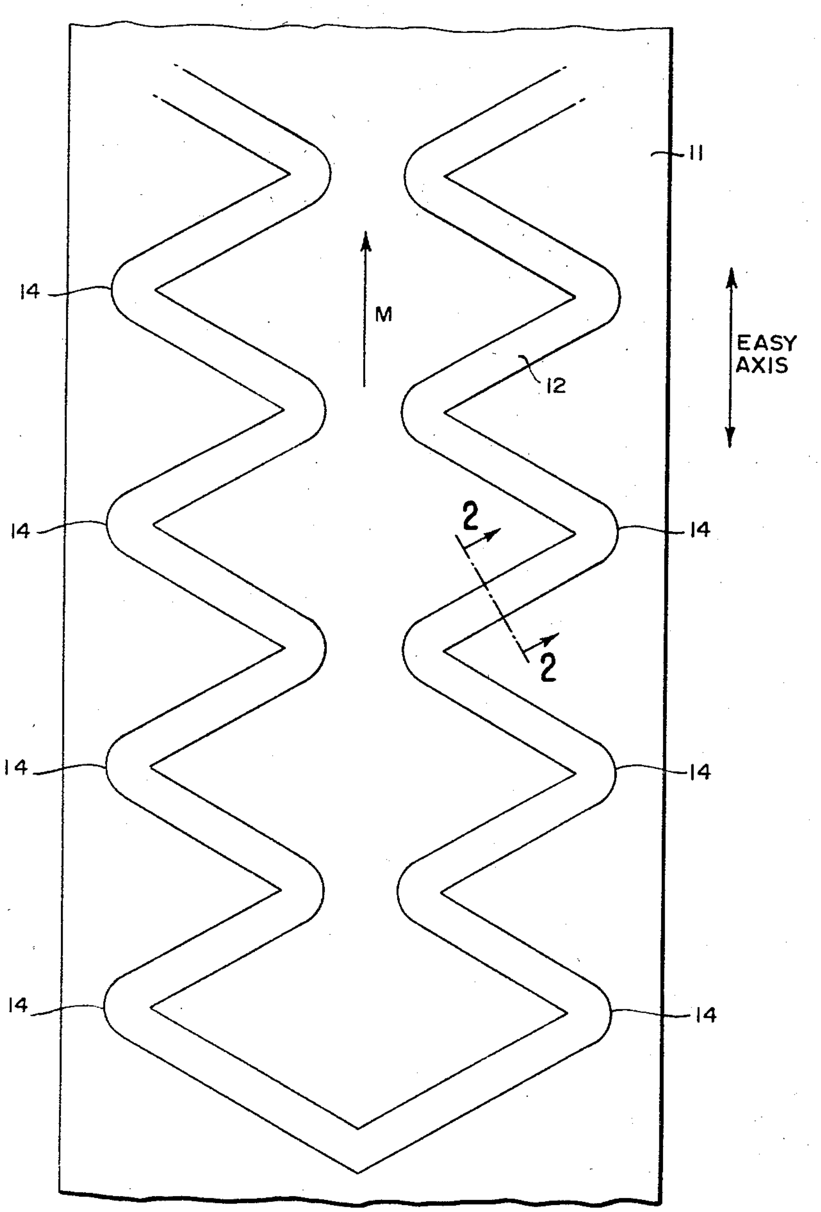
FIG. 1 illustrates one preferred pattern of a low coercive force channel within a high coercive force thin magnetic film.

With reference now to FIG. 1, there is shown a pattern of a low coercive force channel 12 within a high coercive force medium forming a thin magnetic film strip 11. The thin magnetic film 11 has an easy axis of magnetization as indicated by the arrow M. Combination of the illustrated magnetic film configuration with appropriate field producing conductors yields an effective shift register in which information is propagated by transferring a domain of reversed magnetization from one of the channel end tips 14 to another along the zig-zag channel 12. The method by which this propagation takes place will be described more fully below in conjunction with FIG. 3.

A member of different techniques may be utilized to provide for variation of coercive force within a thin magnetic film. These techniques include various types of cleaning procedures for preparing the film substrates, substrate roughening, the application of mechanical stresses, annealing treatments, chemical etching of the film surface and evaporation of different materials prior to the deposition of the magnetic film itself.

Figure 2:
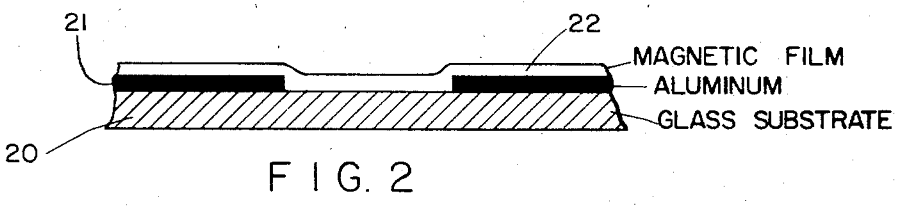
FIG. 2 is a cross-sectional view taken along the line 2—2 of FIG. 1.

In FIG. 2, there is shown a cross-sectional view of a low coercive force channel in a high coercive force medium in which the last-mentioned technique has been employed. This channel was constructed by evaporating onto a glass substrate 20 an aluminum film and subsequently removing the aluminum in the area of the zig-zag channel by photoetching techniques. This sequence leaves the glass substrate 20 coated with an aluminum film 21 in those areas outside of the zig-zag channel. Next, a magnetic film, such as a mixture of 80% Ni, 17% Fe and 3% Co, is evaporated over the aluminum and glass. This magnetic film 22 will be of high coercive force except in the area within the channel which is void of aluminum.

Magnetic films of this type have been formed using the procedure outlined below.

A substrate of glass one inch square is ultrasonically cleaned. An aluminum layer approximately 500 A. thick is then evaporated onto the substrate, the latter held at a temperature of 125° C. This temperature is necessary in order that the increase in coercive force of the permalloy film produced by the underlying aluminum be sufficient for successful shift register operation. Next, the aluminum is coated with a photoresistive material, such as Kodak Photo Resist and after drying and baking, it is exposed to a white light source through a suitable mask having a pattern as shown in FIG. 1. Following developing and baking, the substrate is placed in phosphoric acid and the aluminum etched away in the regions which were masked by the zig-zag channel during the exposure of the KPR. The resultant zig-zag pattern of channels defines the region in which the domain tip propagation will take place. The exposed KPR must then be stripped from the aluminum and the substrate again ultrasonically cleaned. The final step is the deposition of a 1500 A. 80% Ni, 17% Fe, 3% Co, film upon the entire substrate heated to 200° C. An easy anisotropy axis is induced parallel to the long dimension of the shift register, for example, by evaporating in the presence of a magnetic field.

Suitable dimensions for the channel width and magnetic film thickness are a channel width between one and three mils and a magnetic film thickness of about 1500 angstroms.

Figure 3:
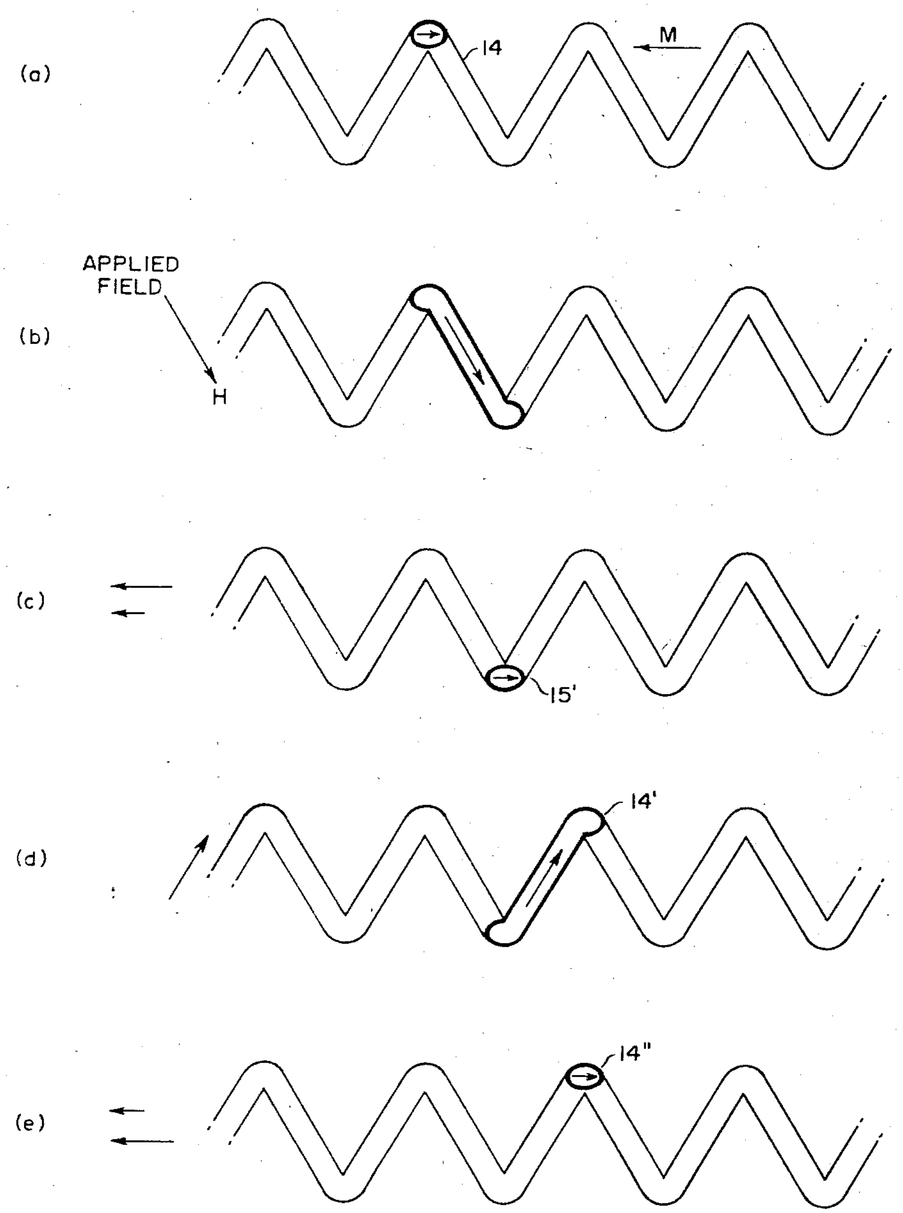
FIG. 3 is a diagrammatic illustration of the propagation of a domain tip along the zig-zag channel of a preferred embodiment of a shift register constructed in accordance with the principles of this invention.

The manner in which a domain tip is propagated along a low coercive force zig-zag channel is illustrated in FIG. 3. The domain tip may be originated by any of several techniques at the first channel and constituted the entry point of the shift register. These techniques will be described in more detail below. It will be apparent that the presence of a domain may represent a positive bit of information in a binary code whereas the absence of a domain of reversed magnetization domain in the same location represents the zero binary state.

Turning now to FIG. 3, the domain tip is seen in FIG. 3*a* to be positioned at channel tip 14 and the easy axis of magnetization is in the direction indicated by the arrow designated M. Application of a magnetic field in opposition to the direction of magnetization of the film, and at an angle deviating from the easy axis to the same degree as the low coercive channel deviates, causes propagation of this domain tip along the zig-zag channel as is indicated in FIG. 3*b*. The next step, as is illustrated in FIG. 3*c*, is the application of a magnetic field along the easy axis of magnetization, thus tending to restore the upper portion of the reversed domain to its unswitched state. If this last-applied field is arranged to have a field gradient providing for a significantly weaker field at the lower end of the channel, as indicated in FIG. 3*c*, then a small portion of the reversed domain at the lower channel end tip 15' will remain unswitched. In the next sequential step a field again generally opposed to the film magnetization is applied, but in this instance at an angle just the reverse of the angle at which the field in FIG. 3*b* was applied. Under these circumstances as illustrated in FIG. 3*d* the domain tip at 15' extends upwardly along the low coercive channel until it reaches the channel end at 14''. If, once again, a field along the easy axis of magnetization is applied, however, with the field now weaker at the upper side of the channel then the domain is again shrunk to a small domain tip now appearing at the channel tip 14'', as illustrated in FIG. 3*e*. These steps describe one complete cycle wherein an information bearing domain tip is transferred from one location (channel tip 14) in the shift register channel to a second location (channel tip 14″). It should be apparent that when the same sequential field is applied to a channel containing no reversed magnetic domain at 14 then there will be generated no reversed magnetic domain at 14″.

The shift register channel illustrated in FIGS. 1 through 3 can be extended over a considerable length since the propagation of information along this shift register is substantially lossless. Additionally, the channels need not extend only in one direction but may be folded over so that information can be propagated down one channel and returned along an adjacent low coercive force channel as illustrated in FIGS. 1 and 5.

Figure 4:
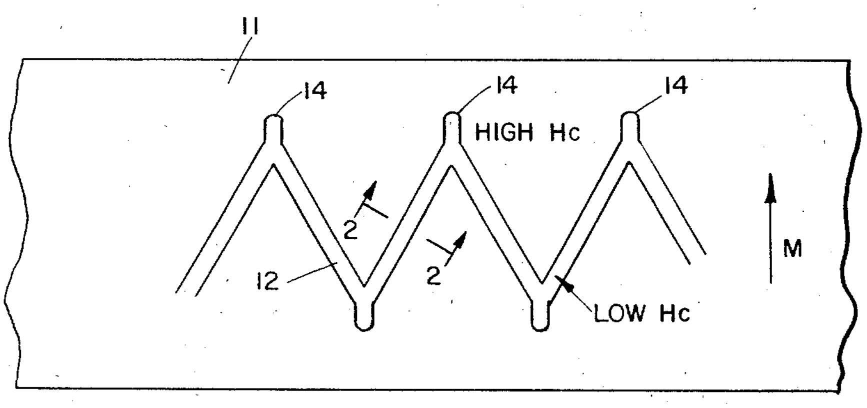
FIG. 4 is an illustration of a second configuration of a low coercive force channel in a high coercive force medium forming a shift register.
Figure 5:
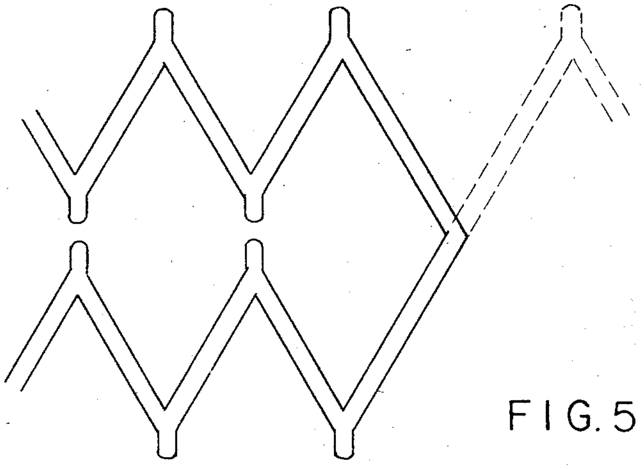
FIG. 5 is an illustration of a third configuration of a low coercive force channel in a high coercive force medium forming a shift register.

A second embodiment of a shift register pattern is illustrated in FIGS. 4 and 5. In this arrangement the shift register extends in a direction normal to the easy axis. In order to provide stability special protruding portions 4 are located at each tip, and the lentil shaped information bit is located in these protrusions.

In addition to the specially prepared magnetic film having a low coercive force channel, as above described, the shift register must also include: (a) means for entering the information bit into the shift register, (b) means for applying a hard axis magnetic field component simultaneously with a reversing field along the easy axis thereby forming a resultant field at a first angle to the easy axis, (c) means for applying a magnetic field along the easy axis having, however, a reduced intensity at one side of the zig-zag channel, (d) means for applying a hard axis magnetic field component at an opposite direction from that of the field applied in means (b), simultaneously with a reversing field along the easy axis to form a resultant field at a second angle to said easy axis, (e) means for applying a magnetic field along the easy axis having reduced intensity at the other side of the zig-zag channel, and (f) means for reading out the output of the shift register at the far end of the channel.

The information bit is entered into the shift register by the nucleation of a small lentil-shaped domain of reversed magnetization at the initial channel end. This may be accomplished by applying a switching field of sufficient magnitude at this location. For a channel in which the coercive force is 2½ to 3 oersteds a suitable nucleation field would be in the order of 15 oersteds. This nucleation field may be applied by passing a sufficiently intense current through a suitable positioned conductor or by the combination of a somewhat weaker field created in that manner together with the stray field associated with a tip domain located in a closely adjacent channel.

Figures 8, 9, 10:
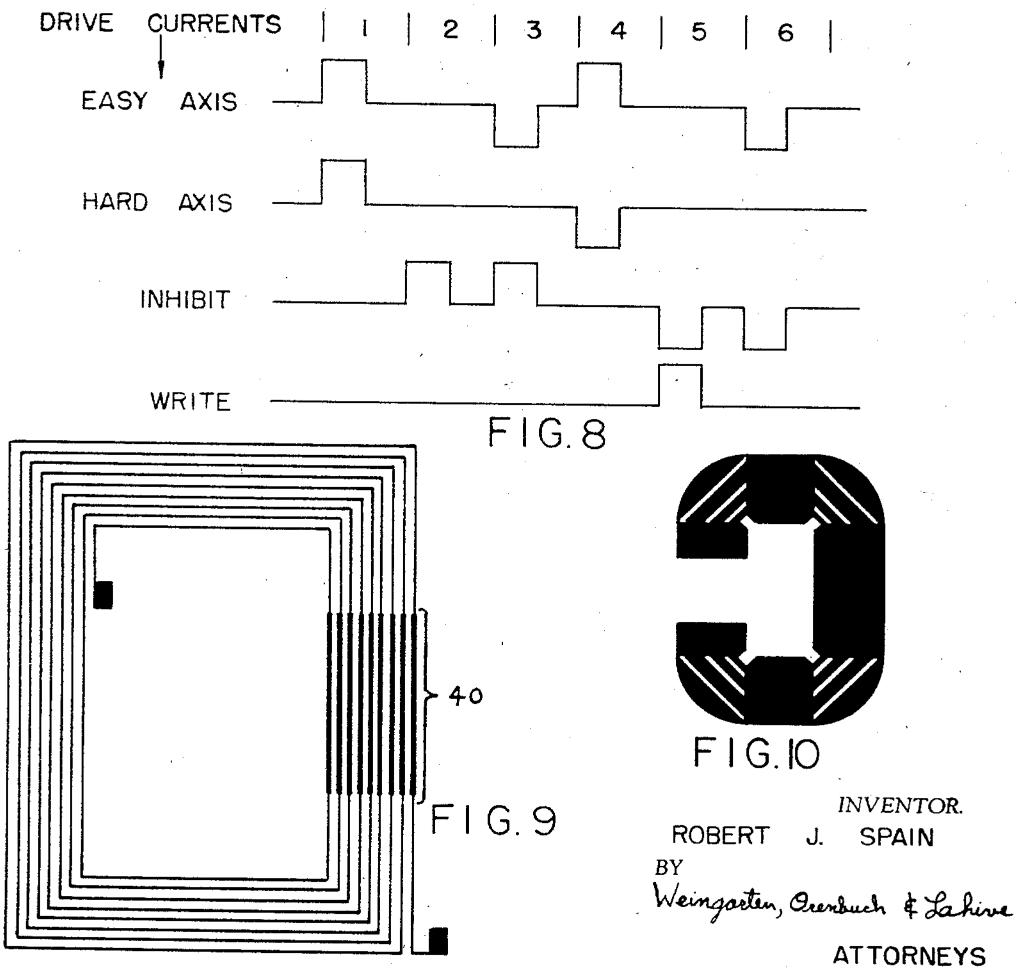
FIG. 8 is a diagrammatic illustration of appropriate pulse sequences for driving the conductors illustrated in FIGS. 6 and 7.
FIG. 9 is an illustration of a hard axis conductor suitable for use in the practice of this invnetion.
FIG. 10 is an illustration of a second configuration of a hard axis conductor suitable for use in the practice of this invention.
Figure 6:
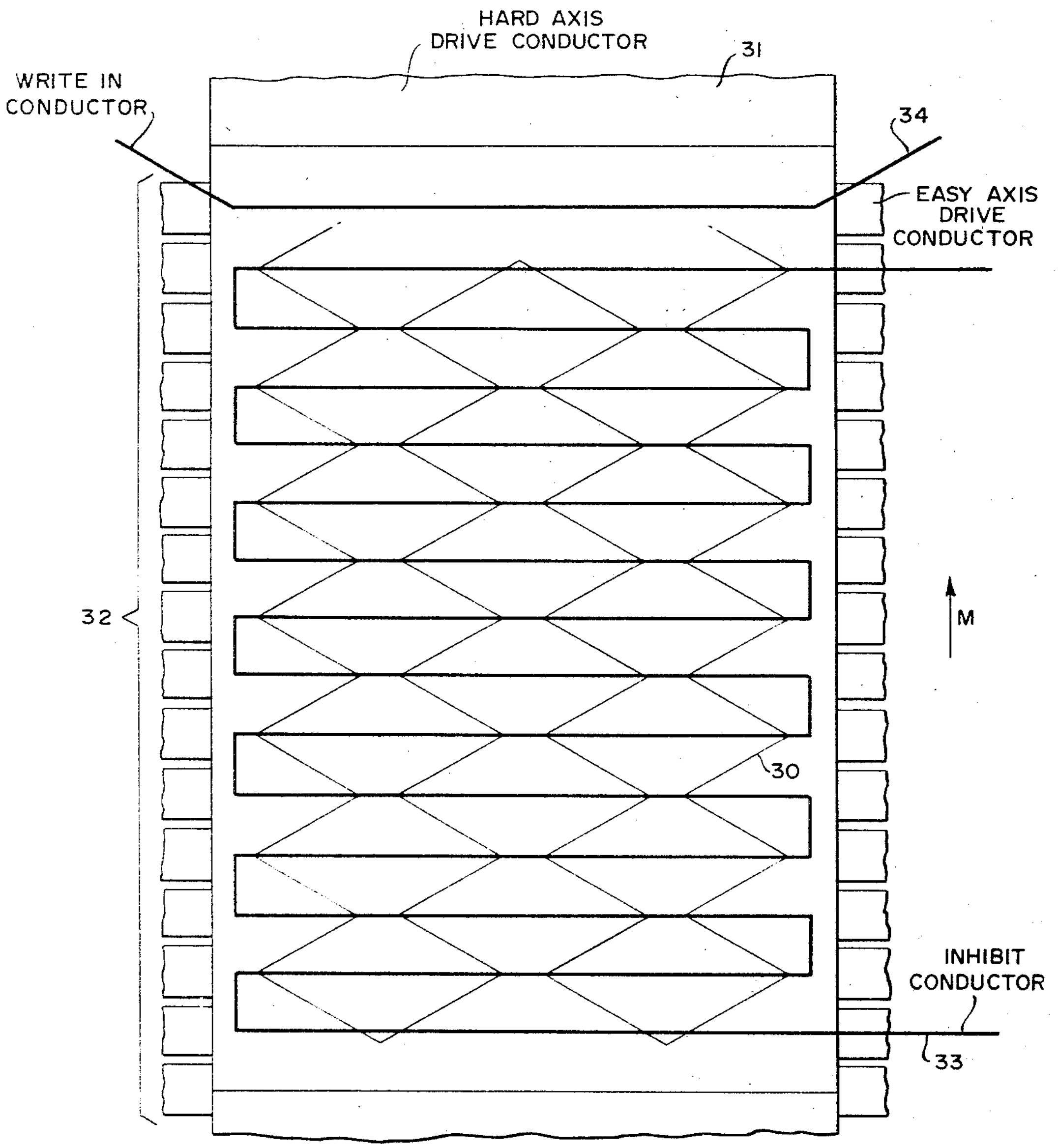
FIG. 6 is a plan view of a preferred embodiment of a shift register in accordance with the principles of this invention illustrating the position of the field producing conductors.

The various means for applying magnetic fields both along the easy and hard axis may conveniently take the form of multiple write-in and drive conductor units. The general configuration of these conductors is illustrated in FIG. 6. Each of the conductors is formed as a printed circuit on a separate layer such that the total conductor structure is a four-layer printed circuit unit in which each of the layers is electrically insulated from the other. Referring now to FIG. 6, the hard axis drive conductor 31 which provides for the magnetic field in a direction normal to the anisotropic easy axis of the film, is formed as a strip conductor which overlies the entire zig-zag low coercive force channel 30. The easy axis drive conductor 32 is formed of a number of conductors running normal to the direction of the easy axis field. Current passed through these conductors, therefore, generates a magnetic field in a direction parallel to this easy axis. An inhibit conductor 33 is formed as an essentially linear conductor which runs underneath the channel tips at both sides of the zig-zag low coercive channel 30. This inhibit conductor serves the function of providing a counteracting field at these channel tips opposing the easy axis field generated by passing current through the easy axis conductor. It is by actuation of this inhibit conductor that the shrinking field is lessened at the appropriate channel ends, thus preventing complete erasure of the domain tip during the shrinking step of the sequence. The write-in conductor 34 is shown as another linear conductor passing directly beneath the initial channel end of the zig-zag channel 30 and passage of sufficient current through this conductor 34 causes nucleation of a small domain at this channel tip and acts as the insertion of a bit into the shift register. As mentioned, the easy axis drive conductor 32 consists of a number of conductors and a suitable configuration for this overall conductor is illustrated in FIG. 9, in which the conductor is shown as a printed circuit in the general form of a coil with each of the individual turns being thickened at one portion 40, which portion would, of course, underlie the zig-zag low coercive force channel.

Figure 7:
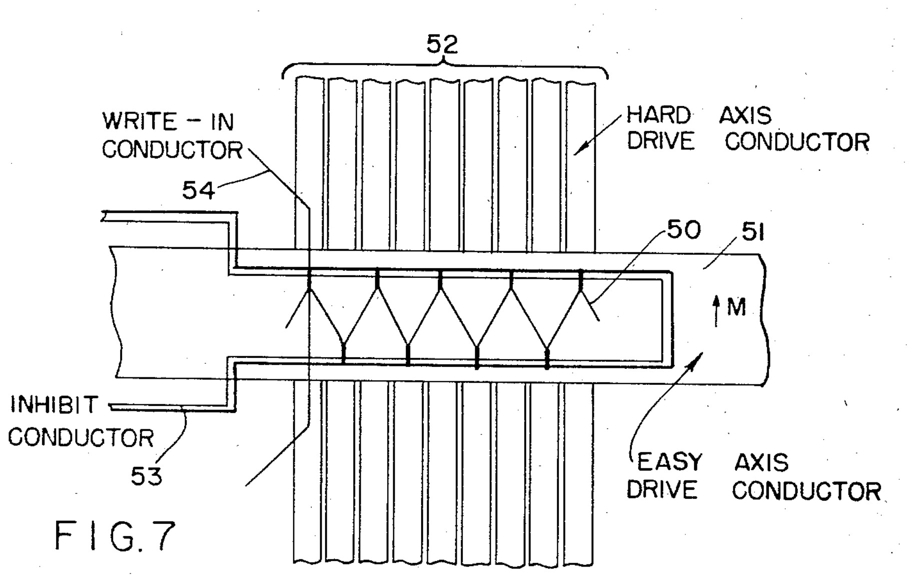
FIG. 7 is a plan view of another embodiment of a preferred embodiment of a shift register in accordance with the principles of this invention illustrating the position of the field producing conductors.

In FIG. 7 there is illustrated an arrangement of conductors suitable for applying the magnetic fields to a shift register of the pattern illustrated in FIG. 4. The conductors perform the same functions, however, they are positioned 90° different with respect to the long axis of the magnetic strip.

The manner in which current pulses are applied to the configuration of conductors illustrated in FIG. 6 to produce an appropriate sequence of magnetic fields in the thin film for propagating a bit of information along the shift register is best described with reference to the pulse sequence diagram of FIG. 8. Thus, as indicated in FIG. 8, in the initial step, current is supplied as a square pulse in the positive direction to both the easy axis conductor 32 and the hard axis conductor 31. In this instance, the current applied to the easy axis conductor 32 is in a direction to cause a magnetic field directly opposing the initial direction of magnetization of the film element. The simultaneous application of current to the hard axis conductor 31 generates a resultant field which is generally in opposition to the magnetization direction and at an angle to the easy axis of magnetization. If we assume that the angular deviation of the channels is at a value such as 15° from the easy axis, then the relative current intensity supplied to the easy axis and hard axis conductors is arranged to cause the resultant field, in the initial step, also to be at a 15° deviation from the easy axis, with the direction of this angular field being such that the domain tip is propagated along the shift register.

The second step of the pulse sequence involves the application of a positive current pulse to the inhibit conductor 33, thereby creating a field at the tips of the zig-zag coercive channel which field reinforces the domain of reversed magnetization which extended the length of a zig-zag leg as a result of the application of the angular field. Two such pulses are applied consecutively to the inhibit conductor 33 (one pulse is sufficient actually if it begins slightly earlier than the shrinking pulse so that time is available for nucleation). The first of these pulses insures that the domain of reversed magnetization extends all the way into the tip of the channel, whereas the second pulse is applied simultaneously with the application of a negative pulse to the easy axis conductor 32. The negative pulse on the easy axis conductor provides a magnetic field along the initial direction of magnetization of the film element, thereby tending to shrink the domain of reversed magnetization which now extends from the initial point of entry diagonally to the right and into the tip of the opposite side of the low coercive force channel. The simultaneous application of a pulse on the inhibit wire acts, however, to cancel out the effects of this easy axis field at the channel tip at the opposite side of the channel, thereby leaving at the end of this sequential step a small lentil-shaped domain in the channel tip at the opposite side of the shift register from the initial point of entry.

In the next sequential step, a positive pulse is again applied to the easy axis conductor 32; however, this time a negative pulse is simultaneously applied to the hard axis conductor 31 resulting once again in a field generally in opposition to the initial direction of magnetization of the film element but at an angle to the easy axis. In this instance, since the current pulse applied to the hard axis conductor is of reversed polarity, the sign of the angle of the reversing field with respect to the easy axis is opposite to that of the angle of the field applied in the initial sequential step. Under these circumstances, the reversed domain tip at the lower side of the channel extends back towards the initial side following the zig-zag channel until it reaches the next channel tip.

Immediately following this domain extending step, a pair of pulses are applied to the inhibit wire 33, but this time in the negative direction thereby creating the field reinforcing the reversed domain of magnetization at the initial entry side of the low coercive force channel. Once again, a pulse is applied to the easy axis conductor 32 simultaneously with the application of the second pulse to the inhibit conductor 33 and the field applied to the low coercive force channel is again along the initial direction of magnetization of the film element with the field intensity substantially lowered this time at the initial side of the low coercive force channel. In this step then, the extended domain of reversed magnetization is again shrunk, however, this time the residual domain of reversed magnetization is in the channel intersection at the initial side. This channel intersection is displaced, however, one location along the long axis of the channel from the point of entry. Hence, the total effect has been to shift the information bit one place down the shift register. It will be noted in FIG. 8 that on the write-in conductor, the write pulse is applied simultaneously with the first inhibit pulse in the second set of inhibit pulses. Since, it will be recalled, the direction of the field created by this second set of pulses on the inhibit conductor is such as to reinforce magnetization reversal at the initial side of the channel, then the write-in field and this inhibit field reinforce one another at the point of entry of the information bit and these fields are arranged to have a cumulative magnitude and direction sufficient to cause nucleation.

A second configuration of an easy axis conductor suitable for use in the shift register of this invention is illustrated in FIG. 10. In this instance the coil shape of the easy axis conductor shown in FIG. 9 has been replaced with a wide flat conductor which has a low inductance but requires a larger current to produce the same magnetic field as the coil-shaped version. The use of lower inductance conductors allows for a faster rise time in the pulses applied.

Figure 11:
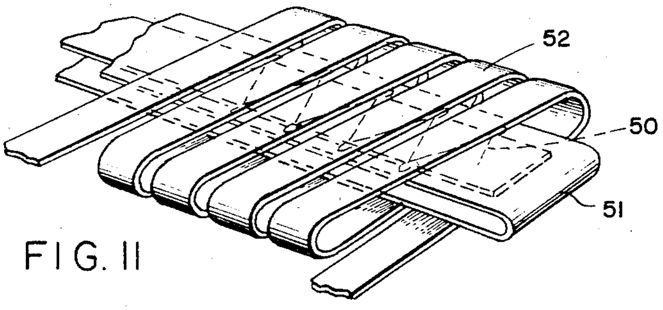
FIG. 11 is a perspective view of another embodiment of the shift register of this invention.

In FIG. 11 there is illustrated another configuration of the shift register in which like numbers refer to like parts of FIG. 7. In this embodiment both the hard axis conductor 52 and the easy axis conductor 51 are "folded over" to traverse both surfaces of the thin film 50. With this arrangement the field strength at a given current is approximately doubled and the inductance is lowered.

While no readout means has been shown for operation at the far end of the shift register, it is apparent that any means of determining the presence or absence of a domain of reversed magnetization may serve to read out the shift register. This can be accomplished either by employing the Kerr magneto-optic effect or by the use of a suitable pick-up coil positioned to respond to the stray magnetic field from a domain tip arriving at the last low coercive force channel tip of the register.

The shift register described above in conjunction with FIG. 6 will operate over a fairly wide range of operating conditions. However, the dimensional characteristics of one specific shift register which has been operated are given below. In this shift register, the magnetic film was a film 1500 A. thick formed of a mixture of 80% Ni, 17% Fe, and 3% Co. The channel was approximately 3 mils wide and from one side of the channel to the other the distance was ⅛". The separation between channel tips on the same side was 1/16". The coercive force within the channel was in the order of 2 to 3 oersteds, while the coercive force of the remainder of the thin film was approximately 20 oersteds. Under these circumstances, a propagation field of 2½ to 3 oersteds was sufficient for propagating an information bit down the shift register. The conductor elements were formed of 1½ mil thick copper bonded to an epoxy board with each of the succeeding conductors being formed of Mylar-backed copper bonded to the lower conductor layer.

Referring to the conductor configurations illustrated in FIG. 6, the easy axis conducting strip was substantially 3/16" wide while the inhibit conductor was 10 mils in width and the write-in conductor was approximately 2 mils in width. The drive pulses applied to these conductors were applied in the sequence illustrated in FIG. 8 and the duration of each of the individual square pulses shown therein was approximately 7 microseconds. The magnitude of the positive pulses applied to the easy axis conductor was approximately 3 amperes, while the negative pulses applied to the same conductor were at a current intensity of 1.5 amperes. At the same time the current applied to the hard axis conductor had an intensity of 1.2 amperes for both positive and negative pulses. The pulses applied to the inhibit conductor were also equal in magnitude for both positive and negative and had a current value of 0.8 ampere. The write-in conductor had a pulse of 1.0 ampere applied to it.

While the above conditions provided satisfactory operation, other dimensions will undoubtedly serve. In order to operate as a shift register it will, of course, be necessary to have a pulse generator, operated from a clock, producing these drive pulses.

The invention having been described various modifications and improvements will occur to those skilled in the art. The invention disclosed herein should be construed as limited only by the spirit and scope of the appended claims.

What is claimed is:

1. A magnetic shift register comprising: a magnetic storage medium having an easy axis of magnetization, said storage medium being magnetized in a first direction along said easy axis, said magnetic storage medium including a region characterized by a substantially lower coercive force than the remainder of said medium, said region extending within said medium both in a direction parallel to said easy axis of magnetization and normal to said easy axis of magnetization, means for applying a reversing magnetic field to an area at one end of said low coercive force region, the intensity of said reversing field being sufficient to nucleate a small domain of reversed magnetization within said area, first means for applying magnetic fields in either direction along the easy axis of magnetization over the entire area of said low coercive force region, means for applying magnetic fields in either direction along an axis normal to said easy axis of magnetization over substantially the entire area of said low coercive force region, and means for actuating each of said field producing means in a sequence such that any domain of reversed magnetization nucleated within said area at the end of said low coercive force region is caused to progress in a predetermined time order along said low coercive force region.

2. A magnetic shift register in accordance with claim 1 wherein said low coercive force region is formed as an extended zig-zag channel and wherein said reversing magnetic field means is arranged to nucleate a small domain of reversed magnetization at one end of said channel.

3. A magnetic shift register in accordance with claim 2 and including second means for applying a field in either direction along the easy axis of magnetization but restricted to regions underlying the intersections of said zig-zag channel.

4. A shift register in accordance with claim 3 wherein said magnetic storage medium is generally formed of a magnetic film disposed over a roughening film, said low coercive force channel within said medium being formed of said magnetic film without the underlying roughening film.

5. A shift register in accordance with claim 4 wherein said thin magnetic film is formed of a mixture consisting of 80% nickel, 17% iron, and 3% cobalt.

6. A magnetic shift register in accordance with claim 3 wherein said magnetic storage medium is a planar magnetic film and wherein said means for applying magnetic fields include a first electrical conductor extending along the longitudinal axis of said zig-zag channel in close proximity to one surface of said planar magnetic film and underlying substantially all of said zig-zag channel, a second electrical conductor disposed in close proximity to one end of said zig-zag channel, a third electrical conductor disposed in close proximity to one surface of said planar magnetic film and arranged to pass under the intersection points on either side of said channel and substantially underlying no other part of said channel, a series of serially connected strip electrical conductors each of said strip conductors being aligned on axes normal to the long axis of said channel and underlying substantially all of said channel, and means for providing energizing currents to each of said electrical conductors in a predetermined sequence.

7. A magnetic shift register in accordance with claim 6 wherein each of said electrical conductors provides a current path in close proximity to one surface of said planar film and a return current path in close proximity to the other surface of said planar magnetic film.

8. Apparatus in accordance with claim 3 wherein the long axis of said zig-zag channel is normal to said easy axis of magnetization of said medium and wherein said low coercive force zig-zag channel is formed to include at each intersection point a portion extending beyond said intersection and in a direction parallel with said easy axis of magnetization.

9. A magnetic shift register in accordance with claim 6 wherein said means for providing energizing current to said conductors includes means for applying square wave pulses to said conductors to generate magnetic fields in the following sequence, (1) simultaneously, a reversing field along said easy axis and a field along an axis normal to said easy axis in a first direction thereby producing a resultant field generally in a direction to reverse the magnetization of said film but angularly inclined with respect to said easy axis, (2) a field along said easy axis of magnetization in said first direction, said field being substantially reduced in intensity along one side only of said zig-zag channel, (3) simultaneously, a magnetic reversing field along said easy axis of magnetization and a field along an axis normal to said easy axis of magnetization in a direction opposite to the direction of the field applied along this axis in step 1 above, (4) a magnetic field along the easy axis of magnetization in said first direction said field having a substantially reduced intensity only along the side of said channel opposite the side where the field intensity was reduced in step 2 above.

References Cited

UNITED STATES PATENTS 3,334,343 8/1967 Snyder ------------ 340—174

BERNARD KONICK, *Primary Examiner.*

GARY M. HOFFMAN, *Assistant Examiner.*